United States Patent
Mikami

[11] 3,895,993
[45] July 22, 1975

[54] ROTARY AUTOMATIC WELDER

[76] Inventor: Masao Mikami, No. 9-19, Kougominami 1-chome, Hiroshima-shi, Hiroshima, Japan

[22] Filed: July 25, 1974

[21] Appl. No.: 491,899

[52] U.S. Cl. ............... 156/582; 100/93 P; 156/583
[51] Int. Cl. ................ B32b 31/00; B02c 11/08
[58] Field of Search .......... 156/582, 583; 100/93 P, 100/93 RP

[56] References Cited
UNITED STATES PATENTS

| 2,670,783 | 3/1954 | Moravec et al. | 156/583 |
| 3,028,294 | 4/1962 | Histed | 156/583 |
| 3,434,908 | 3/1969 | MacDonald | 156/583 |
| 3,530,773 | 9/1970 | Kuhnle | 156/583 |

*Primary Examiner*—Douglas J. Drummond
*Attorney, Agent, or Firm*—Sughrue, Rothwell, Mion, Zinn & Macpeak

[57] ABSTRACT

A rotary automatic welder for fusion-welding strips of cloth in parallel at longitudinally spaced positions on a wide and lengthly cloth piece. The welder comprises a roller in place of a conventional table, a fusion-welding bar, and a plurality of fusion-welding beds, the center shaft on the roller being rotatably supported and the fusion-welding beds being fixed on the opposite sides of the roller.

5 Claims, 6 Drawing Figures

FIG. 3
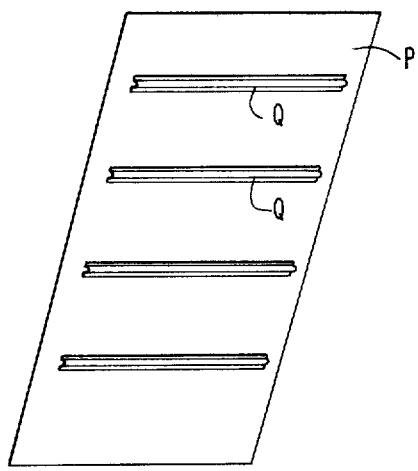
FIG. 5
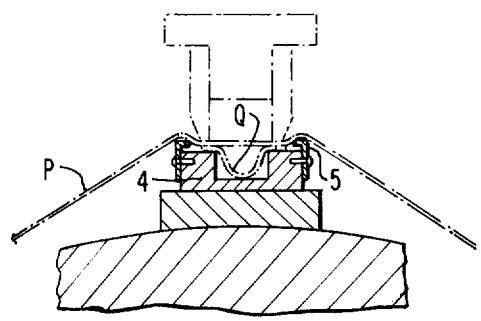
FIG. 4
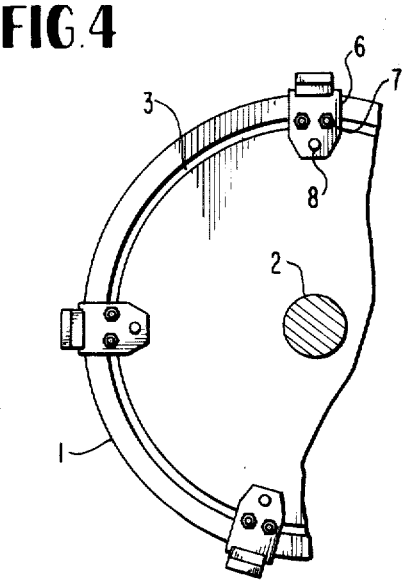
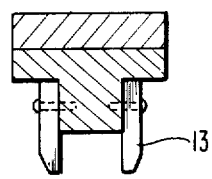
FIG. 6

3,895,993

ROTARY AUTOMATIC WELDER

BACKGROUND OF THE INVENTION

1. Field of the Invention

This invention relates to a rotary automatic welder for fusion-welding in rotary fashion strips of cloth in parallel at longitudinally spaced positions on a wide and lengthy clothpiece as in the fusion-welding of strips of mounting wire holding cloth onto a piece of automobile interior decoration cloth.

2. Description of the Prior Art

Automobile interior decoration cloth takes the form of a head-lining piece of cloth lined with a thermoplastic synthetic resin mounted at the upper inside part of the vehicle by way of several mounting wires attached in the middle portion. In this case, in order to hold the wires on the interior decoration cloth, pieces of holding cloth are fusion-welded into back of interior decoration cloth.

A conventional welder for carrying out the operation described above comprises a wide, lengthy and rectangular table having an area large enough to attach a piece of interior decoration cloth, said interior decoration cloth being laid on the table, which is moved to effect a fusion-welding operation. However, it has been difficult to attach the welding cloth pieces to interior decoration cloth by an operation from only one side by one operator because the width of table is relatively wide, resulting in an operator being required on each side of the table. The conventional welder possesses a further drawback, it occupies a good deal of space posed by the greater length of machine resulting from the wide and lengthy table.

SUMMARY OF THE INVENTION

The present invention eliminates the disadvantages noted above by providing a large-sized roller in place of the table. That is, the structure according to the invention is so designed that an operator facing to the roller may freely move it in both directions, and from this, the invention possesses various effects. The mounting of a wide piece of interior decoration cloth requires only one operator. The operation in the left and right directions may be performed more easily than the operations in directions of movement of the prior machine, which movement is limited; and the size of the machine is considerably reduced.

One preferred embodiment of the invention is illustrated by way of example in the accompanying drawings.

BRIEF DESCRIPTION OF THE DRAWINGS

FIG. 3 is an inclined view of a piece of cloth formed by the apparatus of this invention.

FIGS. 4, 5 and 6 are sectional views taken along lines 4—4, 5—5 and 6—6 respectively of FIG. 2.

DESCRIPTION OF THE PREFERRED EMBODIMENT

Figure 1:
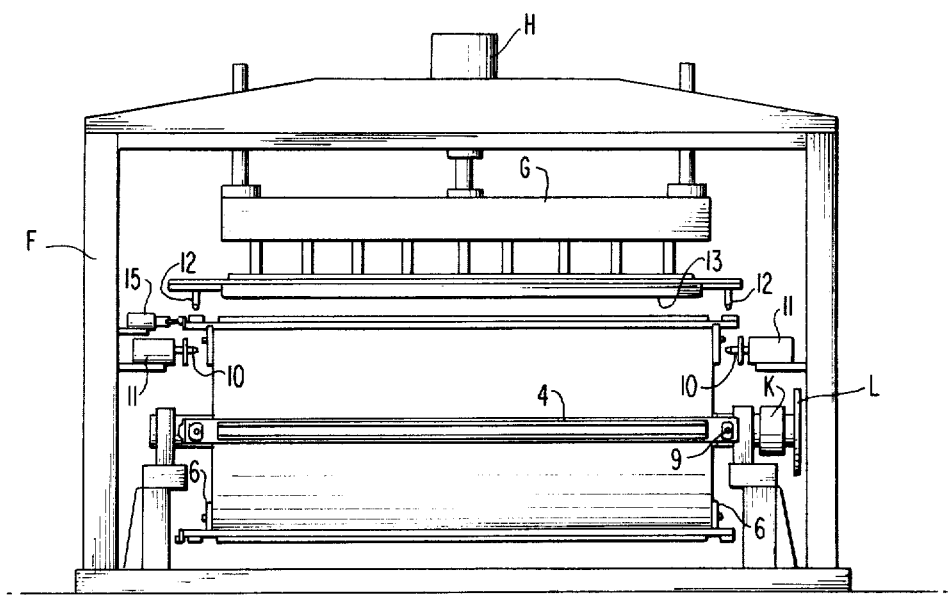
FIG. 1 is a front view.
Figure 2:
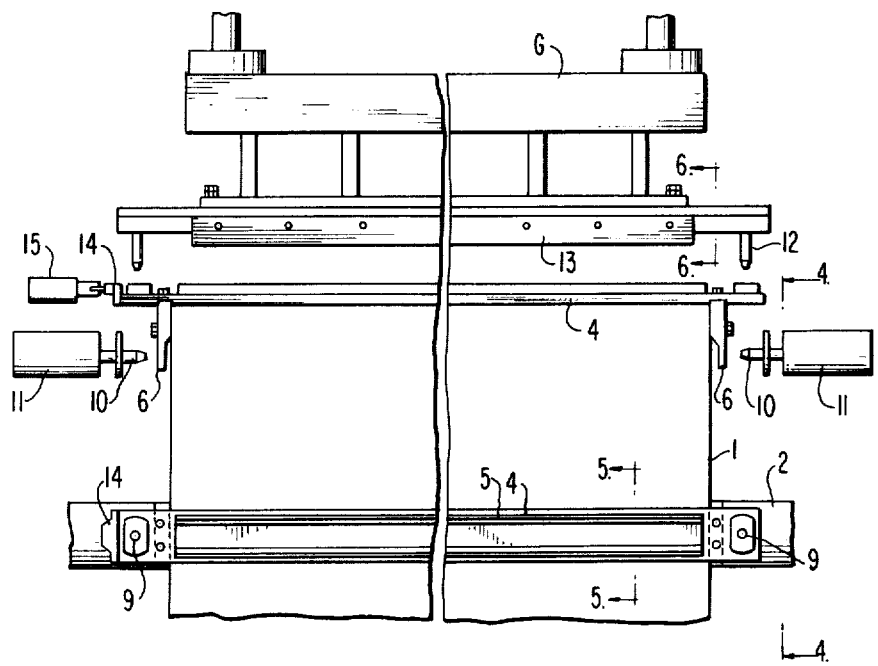
FIG. 2 is a front view of the device of FIG. 1 illustrating a principal portion thereof.

A welder according to a preferred embodiment of the present invention comprises a welder body in the form of a cubiform frame F, a pressing block G adapted to be moved up and down while being guided by the body F, and a pressing cylinder H fixed on the upper frame of the body F, coupled to block G and which is operable to move the pressing block G up and down.

The welder further comprises; a clutch K for rotating a center shaft 2 (later described) of a roller 1 (latter described), a drive wheel L secured to the extremity of shaft of the clutch K, a piece of interior decoration cloth P, strips of holding cloth Q welded to the interior decoration cloth P, which strips extend laterally of the longitudinal axis of piece P, at spaced longitudinal positions and a roller 1 disposed at the lower portion and opposite to the aformentioned pressing block G. A center shaft 2 is fixed to the center of said roller, opposite ends of which are rotatably supported by the body F for rotation about a horizontal axis. A T-shaped groove 3 is circularly cut on opposite sides of the roller 1. Fusion-welding beds 4 of U-shaped cross section are circumferentially spaced, in parallel to the center shaft 2 and extend substantially the complete length of the outer peripheral surface of the roller 1, and central portions of holding cloth Q are laid so as to hang within the U-like grooves, with the longitudinal edges of the stops being fixed by stop plates 5. Locking plates 6 are mounted on the opposite sides of the roller 1 to fix bed plates 4a of respective fusion-welding beds 4 at suitable points on the roller 1 periphery by T-bolt and nuts 7 received in T-shaped side groove 3.

There are shown in the drawing, FIG. 6, positioning openings 8 made in the locking plates 6. Guide openings 9 are made in the opposite ends of each bed plate 4a of the fusion welding bed 4, and positionsetting bars 10 are adapted to be inserted into the positioning openings 8 so as to stop the fusion-welding bed 4 for the rotating roller 1 at a predetermined position, said bars 10 being actuated in and out by air cylinders 11. Guide bars 12 project from the opposite ends of a fusion-welding bar 13 mounted on the underside of the pressing block G and movable up and down therewith, said guide bars being designed so as to be inserted into said guide openings 9. There are further shown contact members 14 fixed on one end of bed plate 4a of each fusion-welding bed 4, and a limit switch 15 fixed to frame 4 adapted to come into contact with said contact members 14 as the drum 1 rotates.

In operation, the end of the interior decoration cloth P as shown in FIG. 3 is first attached to the fusion-welding bed 4, and strips of holding cloth Q are placed in position on the desired number of fusion-welding beds 4 suitably spaced to hang the interior decoration cloth P frontwardly so as to cover these fusion-welding beds 4. When the welding of the invention is then started, the roller 1 initiates its rotation in a given direction. When the limit switch 15 has contact member 14, contact the same, the clutch K is disengaged and the position-setting bar 10 is caused to be projected by operation of the air cylinder 11 after a lapse of a predetermined period through a timer (not shown), thus the extremity of the position-setting bar 10 being received in the positioning opening 8. When the position-setting bar 10 is received in the positioning opening 8, the pressing cylinder H is operated after the bar 10 has been received therein to press down the pressing block G causing the guide bar 12 to be received in the guide opening 9. Thus, the interior decoration cloth P and the holding cloth Q are pressed by the fusion-welding bar 13 and are subjected to heating and fusion-welding by high frequency current for a predetermined period until current is cut off. After being cooled for a predetermined time set by the timer, the pressing block is raised to engage the clutch K and then, the roller 1 initiates its rotation in the same direction to position the next fusion-welding bed 4 directly under the pressing block G. When the limit switch 15 comes into contact with next contact member 14, the clutch K is disengaged. The above-described operation is successively repeated for successive fusion-welding operation, and upon completion of the final fusion-welding operation, the welder is automatically stopped.

When a push button on the operating board (not shown) is depressed to disengage the clutch K, the roller 1 may be rotated by hands. In this case also, the interial decoration cloth may be removed to replace with next cloth for the repetition of operation as described above.

From the above, the welder according to the present invention combines the desirable features of simplicity and time-saving in attaching and removing the material to be fusion-welding with a reduction in space so that, two welders may be oppositely arranged in such a manner that one unit is used to attach and remove a material while the other is in operation, whereby two units may be operated by only one operator to thereby provide an efficient operation.

What is claimed is:

1. A rotary automatic welder comprising:
   a fixed welder frame,
   a fusion welding bar vertically movable on said fixed frame,
   means for moving said bar vertically,
   a center shaft mounted beneath said fusion welding bar for rotation about a horizontal axis,
   a roller, supporting pieces of thermoplastic cloth thereon and being fixed to said shaft and rotatable therewith, about the shaft axis,
   a plurality of fusion welding beds fixed to said roller, extending the length of said roller, parallel to each other, and at spaced circumferential positions about the periphery of said roller, and receiving said clothpieces,
   means for rotating said shaft and said roller, and
   means for locking said roller at positions such that a given fusion welding bed may be fixed with respect to said overlying vertical movable bar and in alignment therewith to permit fusion welding of the pieces of thermoplastic cloth carried by said fusion welding bed.

2. The rotary automatic welder as claimed in claim 1, wherein each fusion welding bed comprises a U-shaped channel member facing outwardly of the roller periphery and having clamping members on respective sides of said channel member, and wherein said welder is employed in fusing strips of thermoplastic cloth to an overlying continuous thermoplastic cloth piece with said strips being of a width in excess to the width of said U-shaped member, and wherein said clamping members clamp respective edges of said strip with the center portion of said strip hanging within the fusion welding bed channel.

3. The rotary automatic welder as claimed in claim 2, wherein respective sides of said roller carry circular grooves and said fusion welding bed comprises bed plates extending the full length of said roller and being coupled to said roller by means of locking plates fixed thereto and carrying bolts whose ends project within respective grooves.

4. The rotary automatic welder as claimed in claim 3, wherein said locking plates include positioning openings therein and said welder further comprises air cylinders fixedly mounted to each side of said roller with said air cylinders each carrying a projectible position setting bar for insertion into the positioning opening of a locking member when said roller is rotated such that said positioning openings are in alignment with said position setting bars.

5. The rotary automatic welder as claimed in claim 4, further comprising guide bars projecting downwardly from opposite ends of the vertically movable fusion welding bar, and guide openings provided at respective ends of each bed plate at positions corresponding therewith such that during downward movement of the fusion welding bar, said guide bars enter said guide openings to guide the fusion welding bar into contact with the pieces of thermoplastic cloth to be fusion welded within the fusion welding bed underlying said bars upon depression thereof into contact therewith.

* * * * *